(12) United States Patent
Lum et al.

(10) Patent No.: US 9,355,483 B2
(45) Date of Patent: May 31, 2016

(54) VARIABLE FRAGMENT SHADING WITH SURFACE RECASTING

(71) Applicant: NVIDIA Corporation, Santa Clara, CA (US)

(72) Inventors: Eric B. Lum, San Jose, CA (US); Rouslan L. Dimitrov, Santa Clara, CA (US); Ignacio Llamas Ubieto, Sunnyvale, CA (US); Patrick James Neill, Portland, OR (US); Yury Uralsky, Santa Clara, CA (US); Albert Meixner, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 288 days.

(21) Appl. No.: 13/946,977

(22) Filed: Jul. 19, 2013

(65) Prior Publication Data

US 2015/0022537 A1    Jan. 22, 2015

(51) Int. Cl.
*G06T 11/40*    (2006.01)

(52) U.S. Cl.
CPC ..................................... *G06T 11/40* (2013.01)

(58) Field of Classification Search
None
See application file for complete search history.

(56) References Cited

U.S. PATENT DOCUMENTS

2001/0028352 A1* 10/2001 Naegle et al. ................. 345/501
2010/0001999 A1*  1/2010 Everitt et al. ................. 345/426

* cited by examiner

*Primary Examiner* — Barry Drennan
*Assistant Examiner* — Diana Hickey
(74) *Attorney, Agent, or Firm* — Zilka-Kotab, PC

(57) ABSTRACT

A system, method, and computer program product are provided for shading primitive fragments. A target buffer may be recast when shaded samples that are covered by a primitive fragment are generated at a first shading rate using a first sampling mode, the shaded samples are stored in the target buffer that is associated with the first sampling mode and the first shading rate, a second sampling mode is determined, and the target buffer is associated with the second sampling mode. A sampling mode and/or shading rate may be changed for a primitive. A primitive fragment that is associated with a first sampling mode and a first shading rate is received and a second sampling mode is determined for the primitive fragment. Shaded samples corresponding to the primitive fragment are generated, at a second shading rate, using the second sampling mode and the shaded samples are stored in a target buffer.

20 Claims, 10 Drawing Sheets

VARIABLE FRAGMENT SHADING WITH SURFACE RECASTING

FIELD OF THE INVENTION

The present invention relates to shading, and more particularly to shading graphics primitive fragments.

BACKGROUND

Conventional multi-sample shading techniques compute one color value per fragment (a collection of samples in a pixel that are covered by one triangle) and the one color value is replicated to all covered samples within the pixel to produce an image with anti-aliased edges. Super-sample shading techniques compute a color for every sample in a fragment, producing an image with anti-aliased edges as well as anti-aliased shading in the interior primitive regions. Therefore, super-sampling typically produces a higher quality anti-aliased image compared with multi-sampling. In general, the processing frame rate using super-sampling is proportional to the number of samples, while the frame rate using multi-sampling is proportional to the number of pixels.

Thus, there is a need for balancing processing performance and image quality during shading and/or addressing other issues associated with the prior art.

SUMMARY

A system, method, and computer program product are provided for shading primitive fragments. A target buffer may be recast when shaded samples that are covered by a primitive fragment are generated at a first shading rate using a first sampling mode, the shaded samples are stored in the target buffer that is associated with the first sampling mode and the first shading rate, a second sampling mode is determined, and the target buffer is associated with the second sampling mode. A shading rate and/or sampling mode may be changed for a primitive. A primitive fragment that is associated with a first sampling mode and a first shading rate is received and a second sampling mode is determined for the primitive fragment. Shaded samples corresponding to the primitive fragment are generated, at a second shading rate, using the second sampling mode and the shaded samples are stored in a target buffer.

DETAILED DESCRIPTION

A sampling mode specifies a number of samples per pixel. Conventionally, the number of samples per pixel is greater than or equal to one. A shading rate specifies the number of samples that are shaded for each pixel that is fully covered by a primitive fragment. The shading rate may be used to specify whether shading is performed using a super-sample technique or a multi-sample technique. For example, a shading rate of one indicates that shading is performed using a multi-sample technique because a single shaded sample value is computed and used for all of the samples of a pixel. A shading rate of N, where N is greater than one indicates that shading is performed using a super-sample technique because N shaded sample values are computed for each pixel. In general, a higher shading rate corresponds to a higher quality image. A target buffer into which the shaded samples are stored is associated with a sampling mode and a shading rate. Conventionally, primitives are processed according to a sampling mode and a shading rate and the same sampling mode and shading rate are associated with the target buffer. The sampling mode and shading rate may determine how data stored in the target buffer is interpreted and/or the resolution of the target buffer.

Based on application requirements, primitive fragments can be generated from a plurality of sampling modes and shading rates. For example, one fragment may be generated using a one sampling mode, while a second fragment from the same primitive may be generated at a second shading rate. The sampling mode and/or the shading rate may be changed for the first and/or second primitive. Shaded samples from both fragments are then stored in a target buffer. Based on the chosen sampling mode, the graphics processor may be reconfigured for efficient utilization of internal datapaths, achieved by recasting the target buffer to a new shading rate. The shading rate is variable per pixel or per group of two or more pixels, and the rate may even be less than one, so that a single shaded sample value is computed for more than one pixel, as described further herein. In other words, a sampling rate may effectively be less than once per pixel.

Figure 1A:
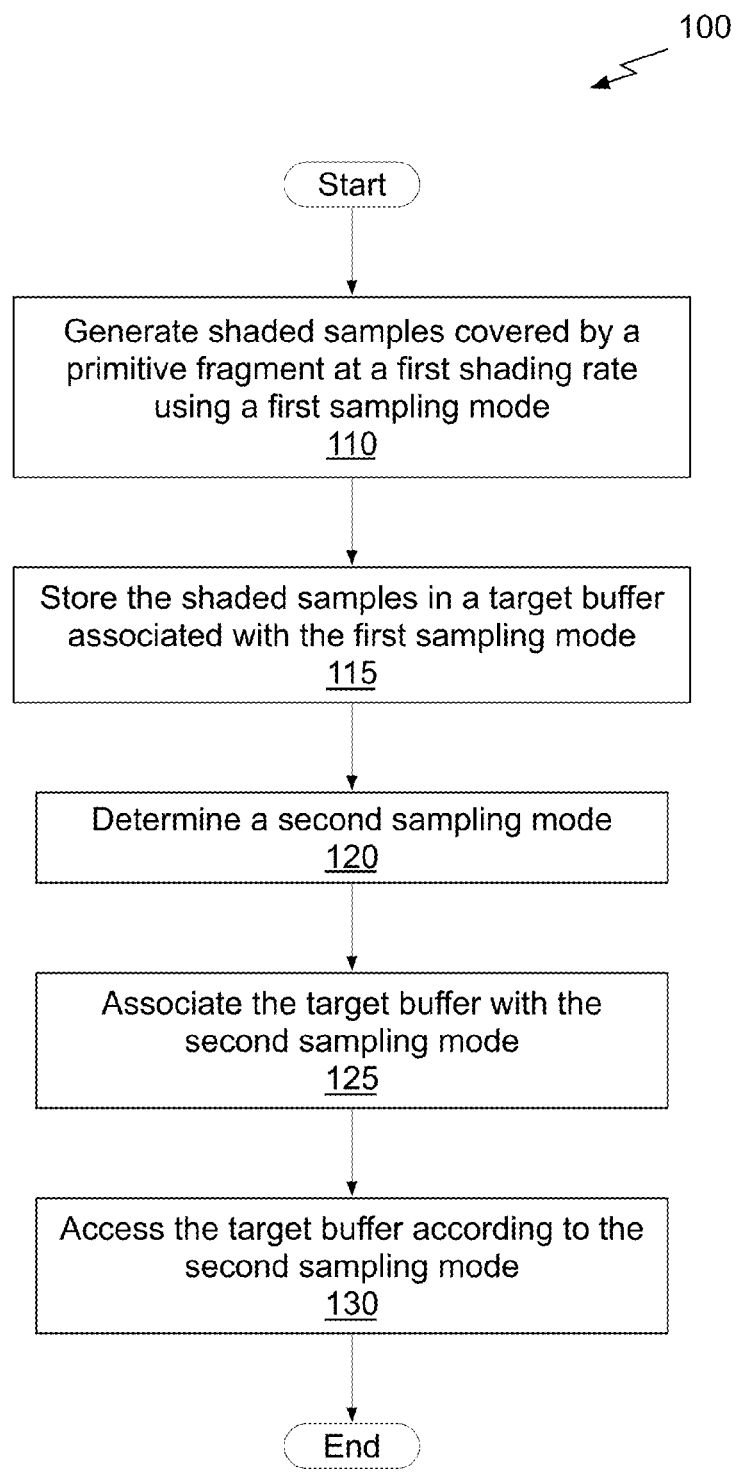
FIG. 1A illustrates a flowchart of a method for recasting a target buffer, in accordance with one embodiment.

FIG. 1A illustrates a flowchart of a method 100 for recasting a target buffer, in accordance with one embodiment. At operation 110, shaded samples that are covered by a primitive fragment are generated at a first shading rate using a first sampling mode. At operation 115, the shaded samples are stored in a target buffer that is associated with the first sampling mode and the first shading rate. At operation 120, a second sampling mode is determined. At operation 125, the target buffer is associated with the second sampling mode. At operation 130, the target buffer is accessed according to the second sampling mode.

The shading rate and/or sampling mode may be determined or changed for each graphics primitive while the graphics primitive is being rendered to improve performance. For example, shading may be performed at an decreased shading rate when a graphics primitive associated with a super-sample (or anti-aliased) sampling mode is processed using an aliased sampling mode. In the context of the following description, the shading rate is a number of samples that are shaded per pixel, so that an increased shading rate corresponds to an increase in per-pixel shader program execution. In particular, the shading rate can be decreased for graphics primitives that do not cover all of the pixels in a pixel group when a processing core is configured to process the pixels in the pixel group in parallel, even processing a pixel in the pixel group that is not covered by a graphics primitive. When a super-sample sampling mode is used, a color value is computed for each sample location in a pixel and a high-quality anti-aliased image may be produced. Therefore, the highest shading rate when a super-sample sampling mode is used is N shader program executions to compute N shaded samples for a fully covered pixel group, assuming that 4 pixels are in a pixel group and each pixel includes N sample locations.

In contrast, when a multi-sample sampling mode is used, a single color value is computed for one sample location in a pixel (typically the pixel center) and the single color value is used (i.e., replicated) for all of the sample locations in the pixel. While a multi-sample sampling mode may also be used to produce an anti-aliased image, the shading quality may be lower in terms of color frequency compared with an image produced using a super-sample sampling mode. The highest shading rate when a multi-sample sampling mode is used is 1 shader program execution for a fully covered pixel group, assuming that 4 pixels are in a pixel group and that one shaded sample is computed for each pixel.

When a multi-sample sampling mode is used, shading may also be performed at a decreased shading rate when a graphics primitive associated with a first multi-sample sampling mode is processed using a second multi-sample sampling mode that has more sample locations for each pixel compared with the first multi-sample sampling mode. For example, a graphics primitive associated with a 2 sample-per-pixel multi-sample sampling mode is processed using a 8 sample-per-pixel multi-sample sampling mode, so that each 8 shaded samples that are generated correspond to 4 pixels of a 2 sample-per-pixel target surface instead of a single pixel. Therefore, the shading rate decreases by 4× compared when rendering to the 2 sample-per-pixel target surface using the 8 sample-per-pixel sampling mode. Specifically, the 8 shaded samples correspond to four pixels each having 2 samples instead of 1 pixel having 8 samples. The shading rate is reduced from one to 1/4 shaded sample per pixel.

Figure 1B:
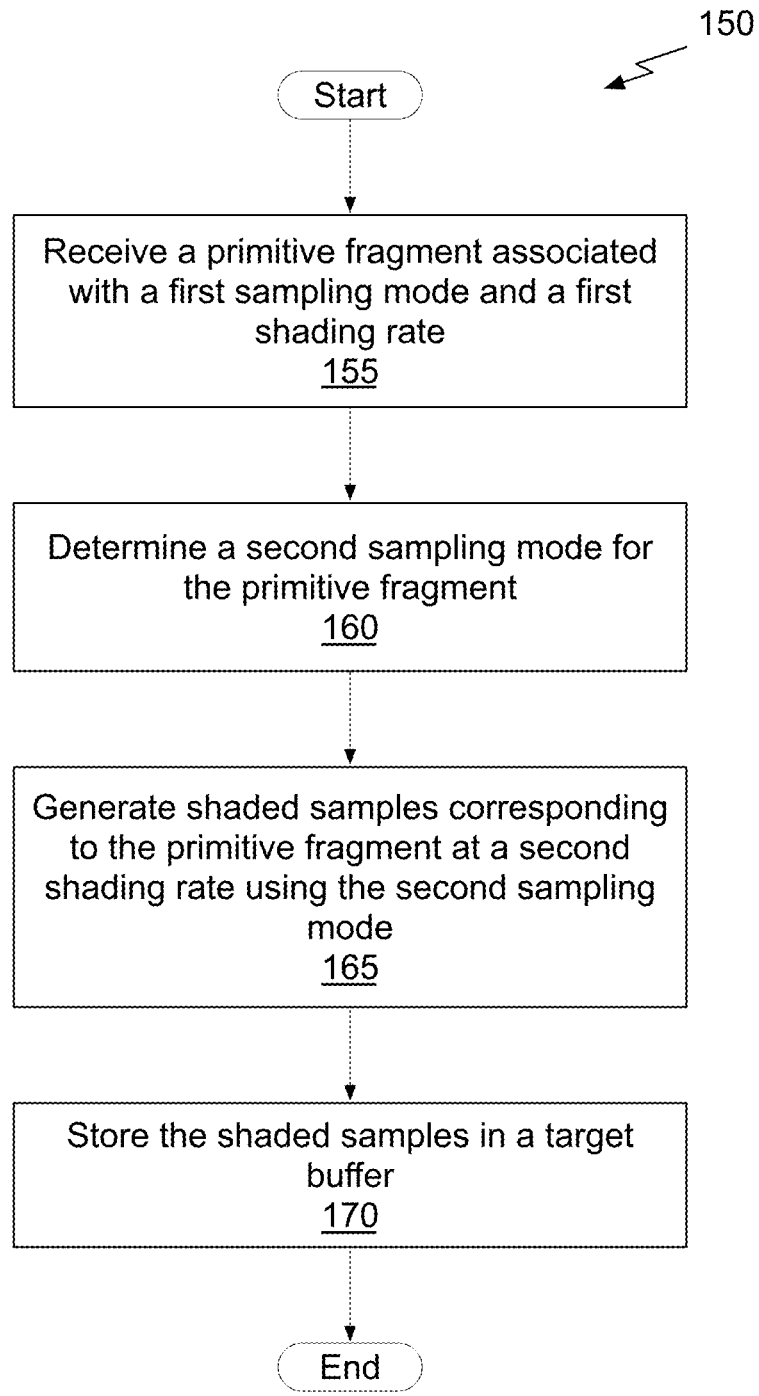
FIG. 1B illustrates a flowchart of a method for performing per-primitive fragment dynamic shading, in accordance with one embodiment.

FIG. 1B illustrates a flowchart of a method 150 for shading a graphics primitive fragment, in accordance with one embodiment. At operation 155, a primitive fragment that is associated with a first sampling mode and a first shading rate is received. At operation 160, a second sampling mode is determined for the primitive fragment. At operation 165, shaded samples corresponding to the primitive fragment are generated, at a second shading rate, using the second sampling mode. At operation 170, the shaded samples are stored in a target buffer.

Figure 2:
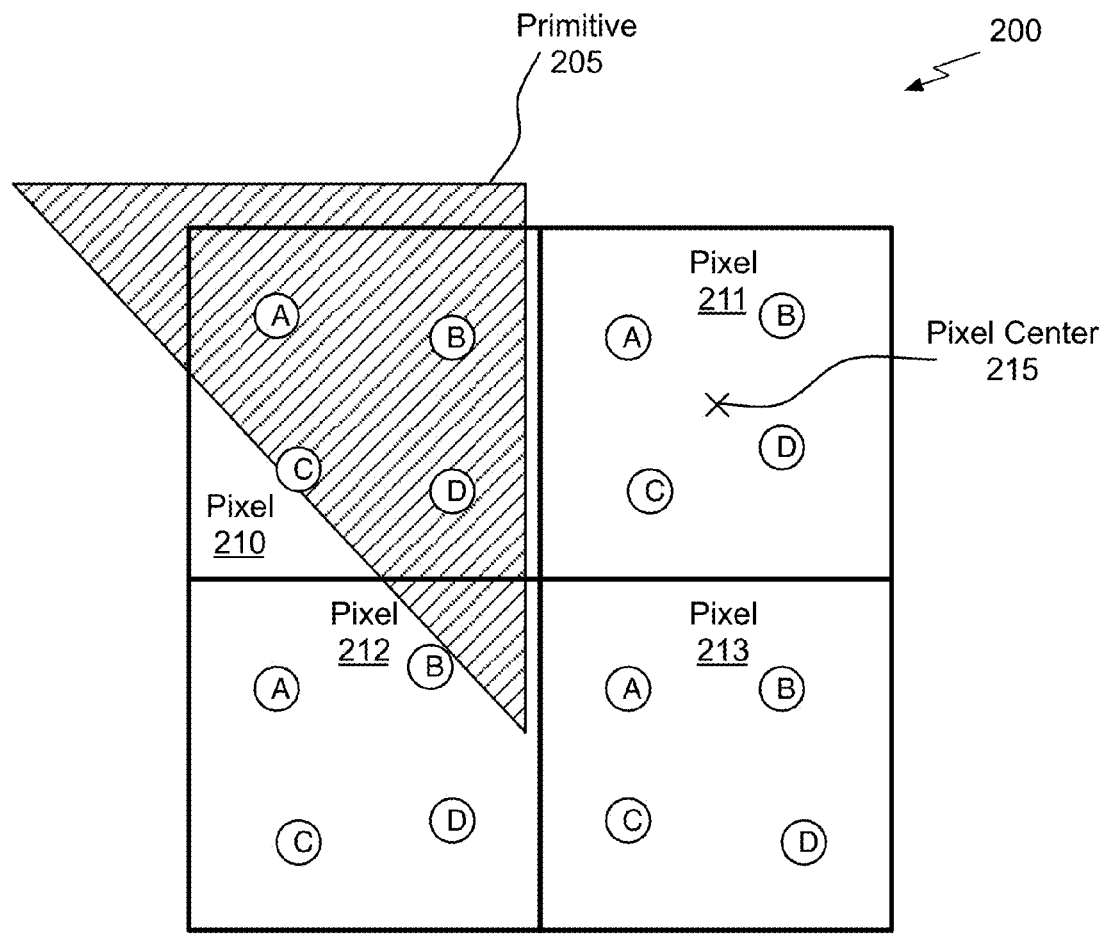
FIG. 2 illustrates a conceptual diagram of sample locations within pixels, in accordance with the prior art.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described, FIG. 2 illustrates a conceptual diagram 200 of sample locations within pixels 210, 211, 212, and 213, in accordance with the prior art. When multi-sampling is used with 4 samples for each pixel, a single color value is computed corresponding to a pixel center (e.g., pixel center 215) and four separate color values corresponding to locations A, B, C, and D are stored in the color buffer for each pixel. When super-sampling is used with 4 samples for each pixel, 4 color values are computed corresponding to each of the sample locations A, B, C, and D and the four color values are stored in the color buffer for each pixel. As shown in FIG. 2, the sample locations may be jittered (i.e., offset or distributed) within each pixel to improve the image quality. In one embodiment, a sample location may be positioned at the center of each pixel.

A parallel processing unit may be configured to process a group of pixels in parallel to generate the shaded color values for the samples (i.e., shaded samples). Processing a 2×2 group of pixels enables the processing unit to compute texture coordinate derivative values (e.g., du/dx, du/dy, dv/dx, and dv/dy) that can be used to compute a texture level-of-detail for the four pixels within the 2×2 pixel group. However, the parallel processing unit is also configured to perform the shading operations for the pixels in the 2×2 pixel group in a SIMD (Single-Instruction, Multiple-Data) manner.

A thread (i.e., a thread of execution) is an instantiation of a set of instructions, such as shader program instructions. A set of threads is executed in parallel to process a pixel group. The parallel processing unit allocates a thread to each pixel in the pixel group and each thread produces a different shaded sample each time the set of threads execute the shader program instructions for the pixel. When multi-sampling is used, each thread in the set of threads executes the shader program instructions once to produce the single color value for a respective pixel in the pixel group. The shading rate is one shaded sample (or one thread shader program execution) per pixel (regardless of the number of samples that are stored for a multi-sample mode).

When super-sampling is used, each thread executes the shader program instructions once to produce a color value for one sample of a respective pixel in the pixel group. When the pixels include four samples, each thread will execute the shader program instructions four times to produce the four shaded samples of a respective pixel. Four threads are consumed per pixel.

A drawback of the SIMD processing technique used by the parallel processing unit is that the four threads execute the shader program instructions, even when one the sample is not covered by a primitive. For example, as shown in FIG. 2, a primitive 205 covers the four sample locations A, B, C, and D of the pixel 210 and does not cover any sample locations in the other pixels of the 2×2 pixels group, namely pixels 211, 212, and 213. Each of the four threads "executes" the shader program instructions to generate a shaded sample for location A in the pixels 210, 211, 212, and 213. Because location A is not covered by the primitive 205 for pixels 211, 212, and 213, three of the four threads are actually idle (or disabled) and do not necessarily execute the shader program instructions. The three idle threads are not available to perform other processing while a shaded sample is produced for one or more of the pixels in the 2×2 pixel group. Therefore, when the thread allocated to produce shaded samples for locations B, C, and D in the pixel 210 executes the shader program instructions a second, third, and fourth time, the threads allocated to the pixels 211, 212, and 213 are also idle. The number of threads that are consumed (computing a shaded sample or idle) for the primitive fragment 205 is 16 to shade the pixel 210. Clearly, some processing efficiency is lost when shading a primitive that does not cover at least one sample in each pixel of a pixel group.

Figure 3A:
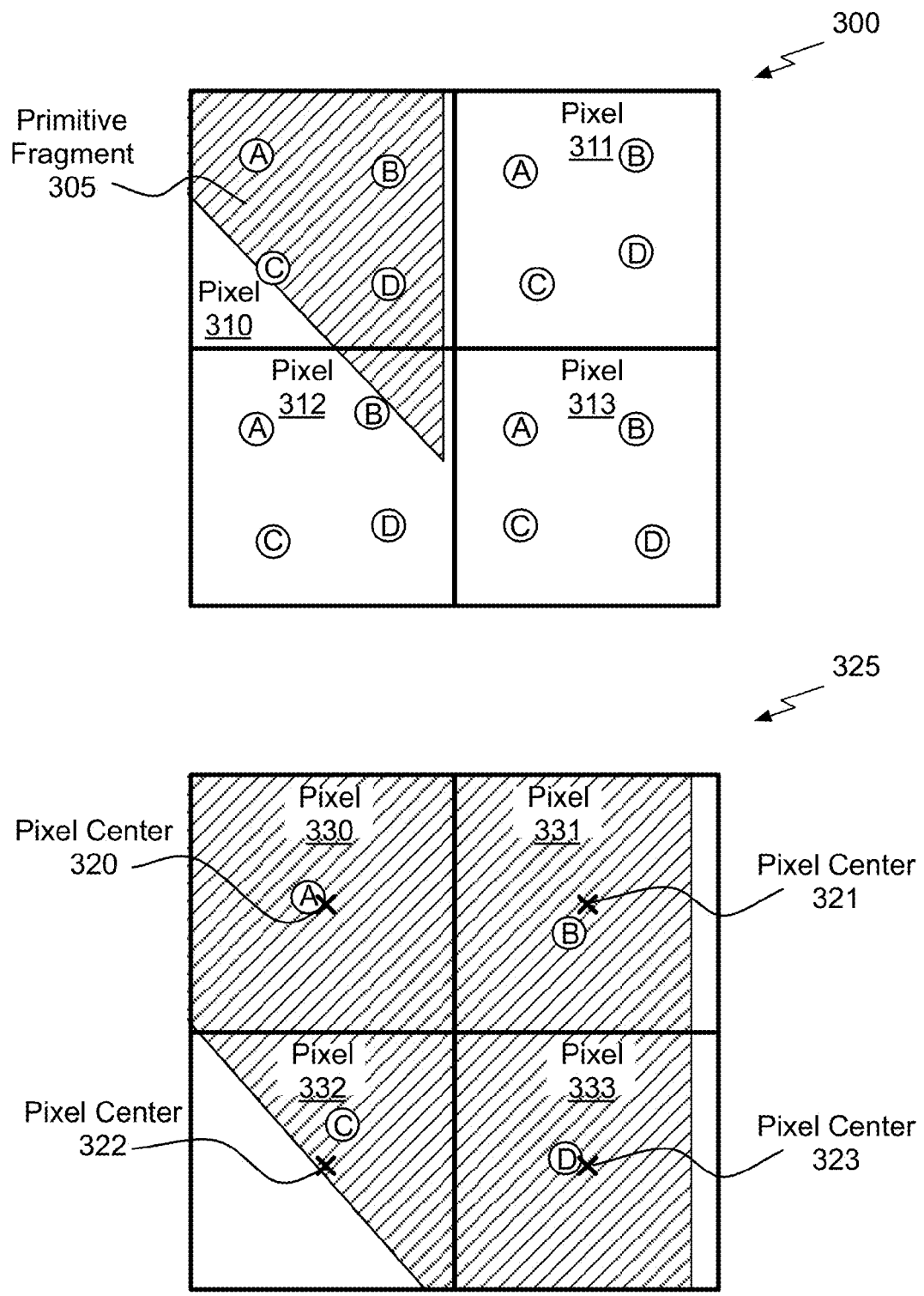
FIG. 3A illustrates another conceptual diagram of a graphics primitive fragment intersecting sample locations in pixels for two different sampling modes, in accordance with one embodiment.

FIG. 3A illustrates a conceptual diagram of a graphics primitive fragment 305 intersecting sample locations in pixels for two different sampling modes, in accordance with one embodiment. The graphics primitive fragment 305 is the portion of the primitive 205 that intersects the pixel group. Pixels 310, 311, 312, and 313 correspond to pixels 210, 211, 212, and 213 of FIG. 2. For the pixel group 300, the sampling mode associated with the primitive fragment 305 is the super-sample sampling mode with four sample locations A, B, C, and D (i.e., 4× super-sampling). Because the primitive fragment 305 only covers a single pixel in the pixel group, the sampling mode is changed from the 4× super-sample sampling mode for the pixel group 300 to a 1× multi-sample sampling mode for the pixel group 325, as shown in the bottom half of FIG. 3A. In one embodiment, the sampling mode is changed based on the pixel coverage characteristics of the primitive fragment 305. The coverage characteristics of the primitive fragment 305 provide an estimate of color variability in the group of pixels 300. In general, as the number of pixels in the pixel group 300 that are covered by a single fragment increases, the color variability typically decreases.

As previously explained, when a multi-sample sampling mode is used, a single color value is produced by each thread, and the single color value may be computed for the pixels centers. As shown in FIG. 3A, color values are computed for the pixel centers 320, 321, 322, and 323 corresponding to the pixels 330, 331, 332, and 333, respectively. Primitive fragment 305 may be rendered to a target buffer having a higher resolution so that each sample of the pixel group 300 corresponds to a different pixel of the pixel group 325. For example, a target buffer designated as a 640×480 pixel buffer configured to store 4× super-sample pixels may be "recast" as a 1280×960 pixel buffer configured to store 1× multi-sample pixels during the generation and storing of the shaded samples for the primitive fragment 305.

The primitive fragment 305 is processed using a 1× multi-sample sampling mode for the recast target buffer having 4× the resolution, so that each of the 4 threads generates a shaded sample when the shader program instructions are executed. The shader program instructions only need to be executed once to generate the four shaded samples and none of the threads are idle. The shaded samples are written to the recast target buffer so that the four shaded samples are stored for the pixel 310. The shading rate for the primitive fragment 305 is decreased by 4× from 4 shaded samples per pixel to 1 shaded sample per pixel. Correspondingly, the number of threads that are consumed to compute shaded samples is reduced from 16 threads for processing the pixel group 300 using the 4× super-sample sampling mode to 4 threads for processing the pixel group 300 using the 1× multi-sample sampling mode.

In another example in which each pixel includes 8 sample locations, a primitive fragment covering all samples of a single pixel may be processed using a ix multi-sample sampling mode for a target buffer having 8× the resolution, so that each of the 4 threads generates a shaded sample when the shader program instructions are executed. The shader program instructions only need to be executed twice to generate the eight shaded samples. The shaded samples may then be written to a 1× resolution target buffer so that the eight shaded samples are stored for the covered pixel. The shading rate for the primitive fragment 305 is decreased by 4× from 32 shaded samples per pixel to 8 shaded samples per pixel. Correspondingly, the number of thread shader program executions for processing the primitive fragment 305 for the pixel group using the 8× super-sample sampling mode is reduced from 32 to 8.

A high-quality anti-aliased image may be produced by changing the sampling mode used to generate shaded samples for primitive fragments from a super-sample to a multi-sample sampling mode and shading performance may be improved by the resulting decreased shading rate. However, the locations of the samples that are generated for the pixel group 325 are not the same as the sample locations A, B, C, and D for the pixel 310 because when a multi-sample sampling mode is used instead of a super-sample sampling mode the color values are computed for the pixel centers 320, 321, 322, and 323. As shown in FIG. 3A, the corresponding sample locations A, B, C, and D are offset from the pixel centers 320, 321, 322, and 323 within the pixels 330, 331, 332, and 333, respectively.

While the offset of the sampling locations does not necessarily compromise the quality of the color values, the offset of the sampling locations can produce inaccurate texture map coordinates which may compromise the quality of the image. A driver kernel may be configured to offset the texture coordinates (u,v) by inserting additional instructions into the shader program, so that the texture coordinates computed for the pixels 330, 331, 332, and 333 equal the texture coordinates that would be computed for the sample locations A, B, C, and D of the pixel 312. In one embodiment, the driver kernel may also be configured to insert additional instructions into the shader program so that computed texture coordinate derivatives are scaled when the rendering resolution is changed. For example, three of the shaded samples may be used to construct a derivative plane equation and each thread may execute an additional shader program instruction to obtain the value of an attribute corresponding to the sample location A, B, C, or D. For example, the additional shader program instruction may be configured to interpolate a plane equation to compute the value of the attribute. In one embodiment, one or more additional shader program instructions are configured to offset texture coordinates and derivative computations when a target buffer is recast.

For some primitive fragments, the coverage of the pixel group 325 may not equal the pixel coverage for the pixel group 300 when the sample locations A, B, C, and D for the pixels in the pixel group 300 are effectively mapped to the pixel center positions 320, 321, 322, and 323 in the pixel group 325. For example, a sample location in the pixel group 300 may be covered by a primitive fragment and the corresponding pixel center in the pixel group 325 may not be covered by the primitive fragment, so that a shaded sample would not be generated for the sample location. Similarly, a narrow primitive fragment may cover a pixel center in the pixel group 325 and not cover a sample location in the pixel group 300, so that an unneeded shaded sample is generated for the sample location. In one embodiment, the driver kernel may be configured to insert additional instructions into the shader program to jitter the sample patterns used for the multi-sample sampling modes so that the sample locations are used instead of the pixel centers (i.e., the sample locations A, B, C, and D in the pixel group 325 are used instead of the pixel centers 320, 321, 322, and 323). In another embodiment, changing the sampling mode from a super-sample sampling mode to a multi-sample sampling mode may be limited to full screen graphics primitives.

Figure 3B:
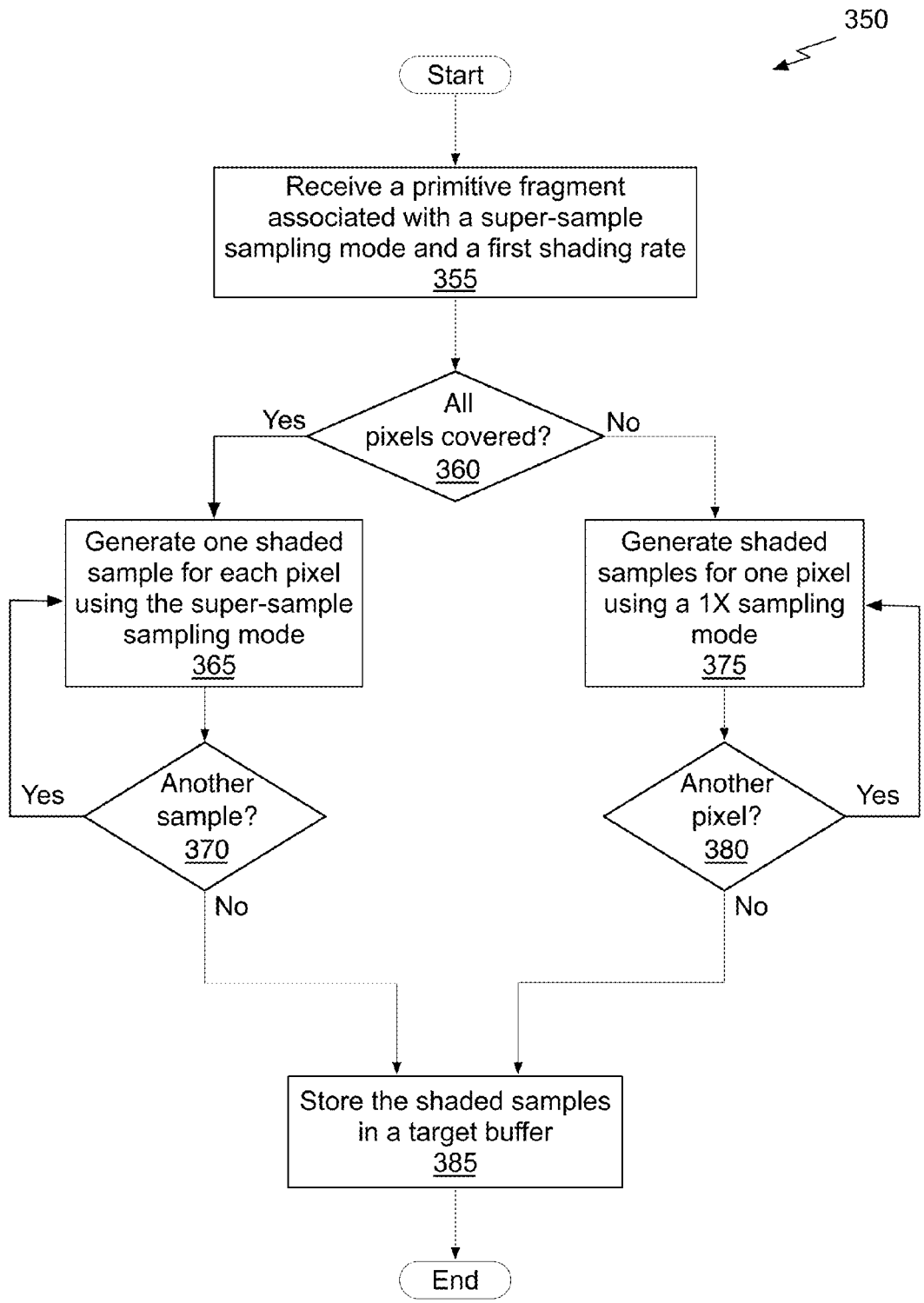
FIG. 3B illustrates another flowchart of a method for performing per-primitive fragment dynamic shading, in accordance with one embodiment.

FIG. 3B illustrates another flowchart of a method 350 for performing per-primitive fragment dynamic shading, in accordance with one embodiment. At operation 355, a primitive fragment that is associated with a super-sample sampling mode and a first shading rate is received by a processing core that is configured to execute shader program instructions. The first shading rate is dependent on the number of samples per pixel, such that the first shading rate decreases as the number of samples per pixel decreases. Similarly, the number of threads consumed to compute the shaded samples decreases as the shading rate decreases.

At operation 360 the processing core determines if all of the pixels in a pixel group, such as the pixel group 300, are covered by a primitive fragment. When all of the pixels are not covered only a portion of the pixels in the pixel group that is processed in parallel by a set of threads is covered by the primitive fragment. If all of the pixels are covered, then at operation 365 one shaded sample is generated by each thread allocated to the pixel group. In the context of the present description, the processing core may allocate one thread to each pixel of a pixel group and shader program instructions may cause the threads to determine if all of the pixels are covered by the primitive fragment. In one embodiment, a pixel group may include two or more adjacent pixels (e.g., 2×1, 1×2, 2×2, etc.).

At operation 365, the super-sample (SS) sampling mode is used to generate the shaded samples. At operation 370, the processing core determines if another sample location should be processed for at least one of the pixels in the pixel group, and, if so, the shader program is executed by one or more threads to generate shaded sample(s) for the other sample location. Otherwise, shaded samples have been generated for the covered sample locations in the pixel group, and at operation 385 the threads store the shaded samples in a target buffer. The target buffer may be a color buffer that is stored in a memory and configured to store one or more shaded samples for each pixel.

If, at operation 360, the processing core determines that all of the pixels in the pixel group are not covered by the primitive fragment, then, at operation 375, one shaded sample is generated by each thread allocated to the pixel group. At operation 365, the super-sample sampling mode that is associated with the primitive fragment is not used to generate the shaded samples. Instead, a ix multi-sample sampling mode is used to generate the shaded samples at operation 375.

When each pixel includes four samples and only a single pixel is covered by the primitive fragment, the ix multi-sample sampling mode corresponds to 4 thread shader program executions per pixel or a shading rate of 4 shaded samples per pixel, so that all of the shaded samples may be generated when the four threads execute the shader program once. In contrast, the shading rate corresponding to the super-sample sampling mode is 16 shaded samples per pixel or 16 thread shader program executions per pixel. When each pixel includes four samples and only two pixels are covered by the primitive fragment, the 1× multi-sample sampling mode corresponds to a shading rate of four shaded samples per pixel (or 4 thread shader program executions per pixel), so that all of the shaded samples may be generated when the four threads execute the shader program twice. In contrast, the shading rate corresponding to the super-sample sampling mode is 16 shaded samples per two pixels (or 16 thread shader program executions per two pixels).

At operation 380, the processing core determines if another pixel should be processed for at least one of the pixels in the pixel group, and, if so, the shader program is executed by one or more threads to generate shaded sample(s) for the other pixel. Otherwise, shaded samples have been generated for the covered sample locations in the pixel group, and, at operation 385, the threads store the shaded samples in a target buffer. The target buffer may be a color buffer that is stored in a memory and configured to store one or more shaded samples for each pixel.

As previously described the sampling mode may be changed from a super-sample sampling mode to a multi-sample sampling mode to decrease the shading rate. When a multi-sample sampling mode is specified for shading one or more primitives, a resolution of the multi-sample mode may be changed to decrease the shading rate. The shading rate may be decreased so that each thread shader program execution computes shaded samples for multiple pixels by reducing the resolution of the multi-sample mode. The color value computed for a pixel center is used to produce shaded samples for two or more pixels instead of being used to produce shaded samples for only one pixel.

Figure 4A:
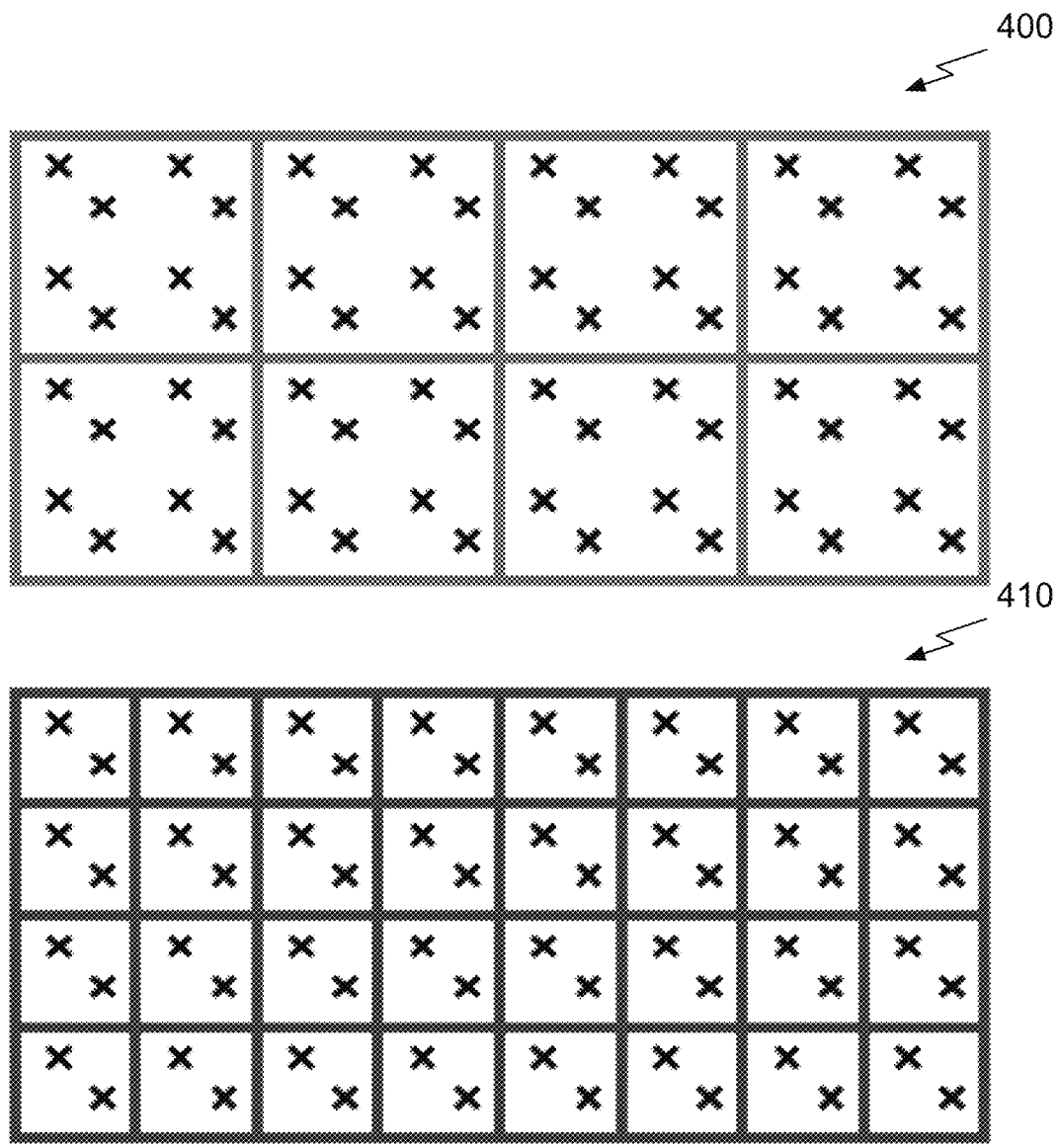
FIG. 4A illustrates a conceptual diagram of two different sampling modes for shading graphics primitive fragments, in accordance with one embodiment.

FIG. 4A illustrates a conceptual diagram of two different sampling modes for shading graphics primitive fragments, in accordance with one embodiment. A 2× multi-sample sampling mode is specified for the 8×4 pixel target buffer 410, where each "x" corresponds to a sample location. The target buffer 410 may be recast as an 8× multi-sample target buffer resulting in the recast target buffer 400 that stores shaded samples for a 4×2 pixel region. When the target buffer 410 is recast, the total number of samples is unchanged. The shading rate for the target buffer 410 is one, e.g., 4 shaded samples for 4 pixels. Four thread shader program executions are needed to compute the 4 shaded samples. The shading rate for the target buffer 400 is also one. However, when the target buffer 410 is recast as target buffer 400 and interpreted as a 2× multi-sample target buffer instead of an 8× multi-sample target buffer, the shading rate is 1/4, e.g., 4 shaded samples for 16 pixels. Four thread shader program executions compute 4 shaded samples for the recast target buffer 400 that correspond to 16 pixels for the target buffer 410.

A target buffer designated as a 1280×960 pixel buffer configured to store 2× multi-sample pixels may be "recast" as a 640×480 pixel buffer configured to store 8× multi-sample pixels during the generation and storing of the shaded samples for one or more primitive fragments. The edge sharpness of full resolution rendering may be preserved for the recast target buffer while the shading rate is decreased. However, because a generated color value is replicated to generate shaded samples for multiple pixels, recasting a multi-sample buffer to a lower resolution buffer (in terms of pixels) is best suited for low frequency or constant color textures. Recasting a multi-sample buffer to a lower resolution buffer may also be used to render shadowmaps where a shader program is configured to remove coverage based on whether a pixel is lit by a light source rather than compute a color value directly.

In one embodiment, the sampling mode may be dynamically changed for shading each primitive fragment. In another embodiment, the sampling mode may be changed to decrease the shading rate and reduce power consumption of a graphics processor. When recasting a multi-sample buffer to a lower resolution buffer is used for final rendering, post-processing of the higher resolution target buffer may be used to interpolate values between groups of constant color pixels to reduce any "screen door" artifacts resulting from the decreased shading rate.

Figure 4B:
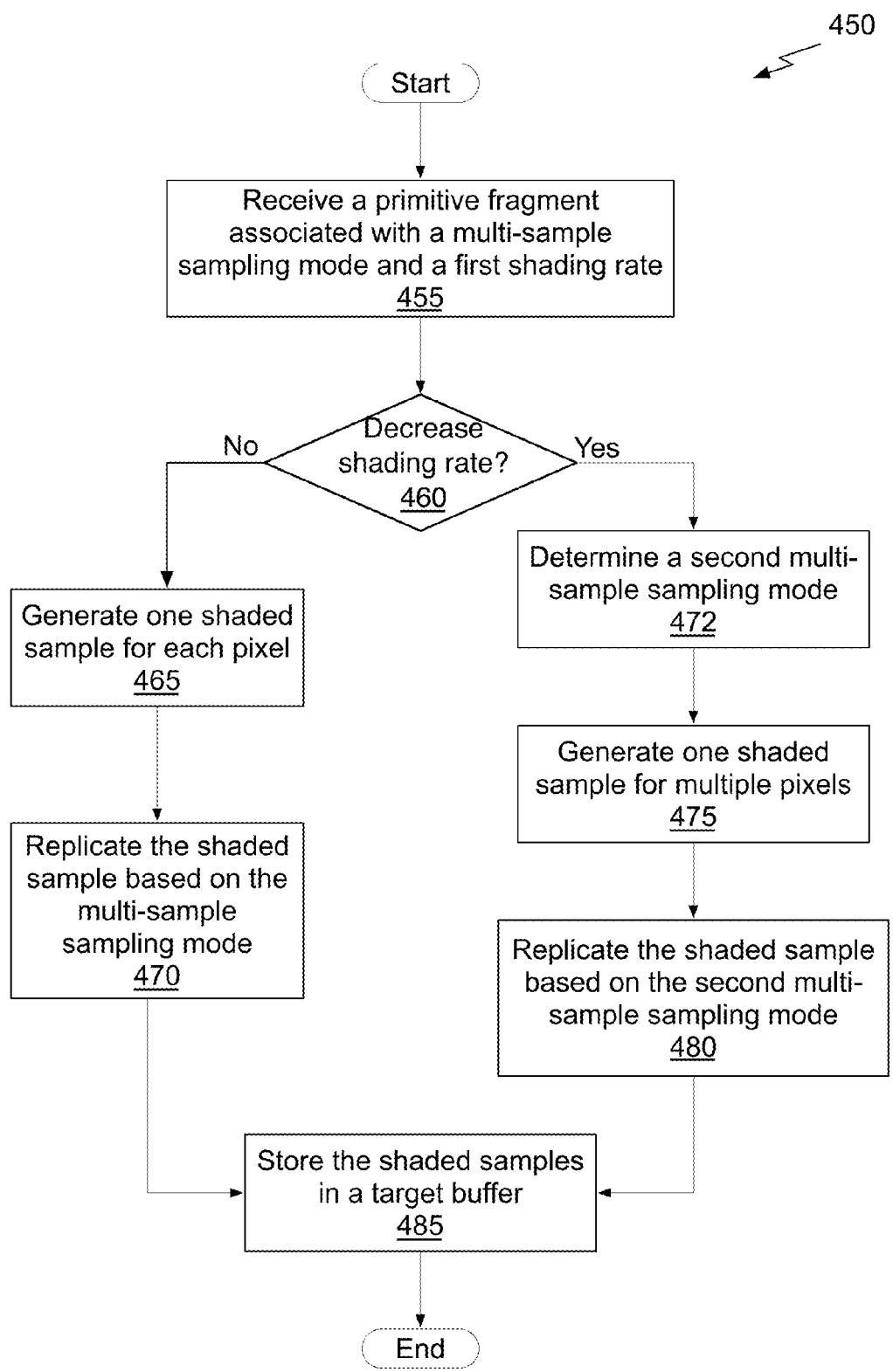
FIG. 4B illustrates another flowchart of a method for performing per-primitive fragment dynamic shading, in accordance with one embodiment.

FIG. 4B illustrates another flowchart of a method 450 for performing per-primitive fragment dynamic shading, in accordance with one embodiment. At operation 455, a primitive fragment that is associated with a first multi-sample sampling mode corresponding to a first shading rate is received by a processing core that is configured to execute shader program instructions. The first shading rate corresponds to one thread shader program execution per pixel.

At operation 460, the processing core determines if the shading rate should be decreased. If the shading rate should not be increased, then, at operation 465, one shaded sample is generated by each thread allocated to a pixel in a pixel group and the first multi-sample sampling mode is used to generate the shaded samples. At operation 470, each thread replicates the one shaded sample based on the first multi-sample sampling mode. For example, when the first multi-sample sampling mode is 4×, the one shaded sample is replicated to produce 4 shaded samples. At operation 485, the threads store the shaded samples in a target buffer. The target buffer may be a color buffer that is stored in a memory and configured to store one or more shaded samples for each pixel.

If, at operation 460, the processing core determines that the shading rate should be decreased, then, at operation 472, a second multi-sample sampling mode is determined that corresponds to a second shading rate. At operation 475, one shaded sample is generated by each thread allocated to a pixel in a pixel group and the second multi-sample sampling mode is used to generate the shaded samples. At operation 480, each thread replicates the one shaded sample to generate shaded samples for multiple pixels based on the second multi-sample sampling mode. For example, when the first multi-sample sampling mode is 8× and the second multi-sample sampling mode is 2×, the shaded sample for one pixel is replicated to produce 4 shaded samples for 4 different pixels. At operation 485, the threads store the shaded samples in a target buffer. The target buffer may be a color buffer that is stored in a memory and configured to store one or more shaded samples for each pixel.

Figure 5:
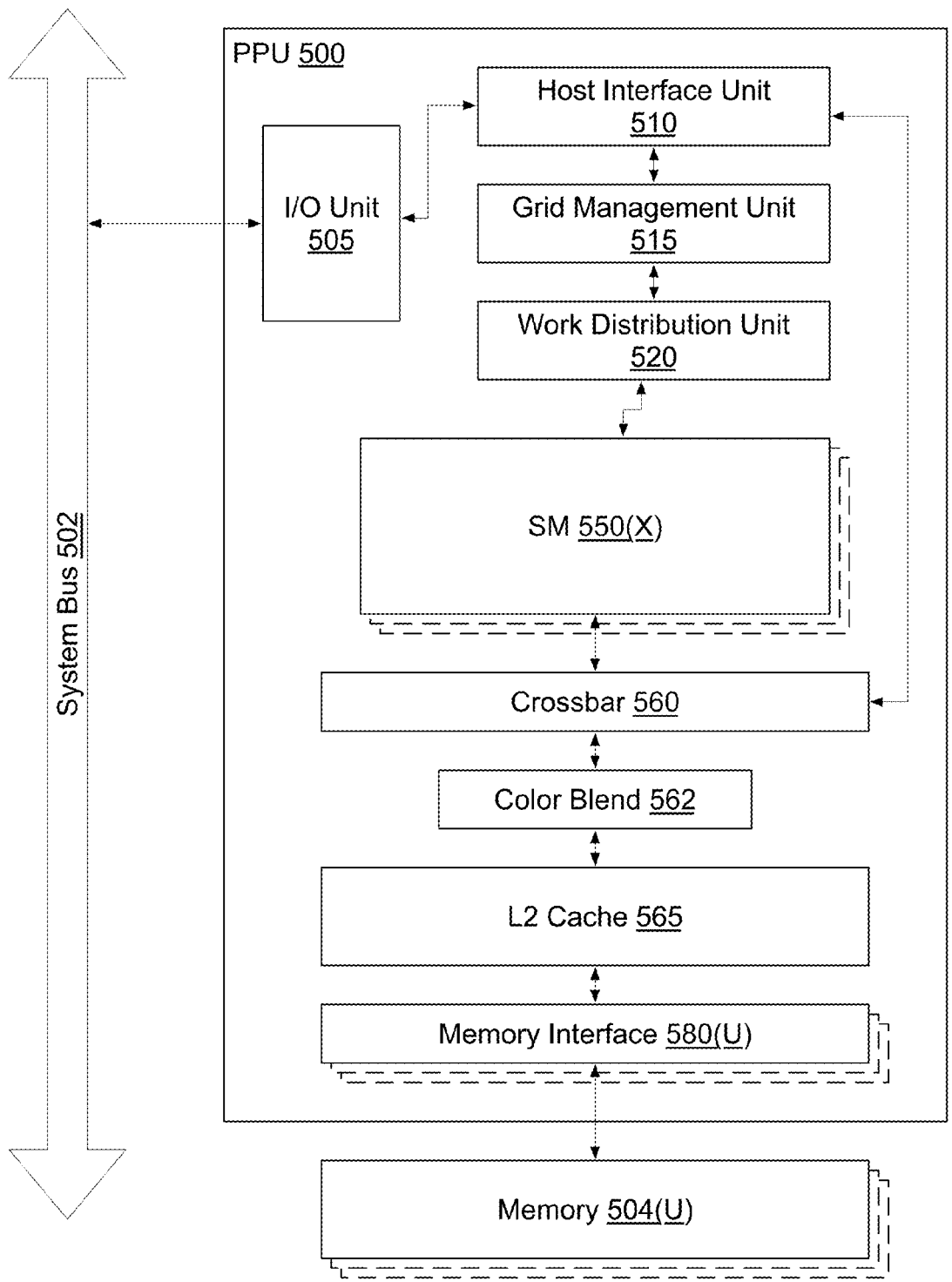
FIG. 5 illustrates a parallel processing unit (PPU), according to one embodiment.

FIG. 5 illustrates a parallel processing unit (PPU) 500, according to one embodiment. While a parallel processor is provided herein as an example of the PPU 500, it should be strongly noted that such processor is set forth for illustrative purposes only, and any processor may be employed to supplement and/or substitute for the same. In one embodiment, the PPU 500 is configured to execute a plurality of threads concurrently in two or more streaming multi-processors (SMs) 550. A thread (i.e., a thread of execution) is an instantiation of a set of instructions executing within a particular SM 550. Each SM 550, described below in more detail in conjunction with FIG. 6, may include, but is not limited to, one or more processing cores, one or more load/store units (LSUs), a level-one (L1) cache, shared memory, and the like.

In one embodiment, the PPU 500 includes an input/output (I/O) unit 505 configured to transmit and receive communications (i.e., commands, data, etc.) from a central processing unit (CPU) (not shown) over the system bus 502. The I/O unit 505 may implement a Peripheral Component Interconnect Express (PCIe) interface for communications over a PCIe bus. In alternative embodiments, the I/O unit 505 may implement other types of well-known bus interfaces.

The PPU 500 also includes a host interface unit 510 that decodes the commands and transmits the commands to the grid management unit 515 or other units of the PPU 500 (e.g., memory interface 580) as the commands may specify. The host interface unit 510 is configured to route communications between and among the various logical units of the PPU 500.

In one embodiment, a program encoded as a command stream is written to a buffer by the CPU. The buffer is a region in memory, e.g., memory 504 or system memory, that is accessible (i.e., read/write) by both the CPU and the PPU 500. The CPU writes the command stream to the buffer and then transmits a pointer to the start of the command stream to the PPU 500. The host interface unit 510 provides the grid management unit (GMU) 515 with pointers to one or more streams. The GMU 515 selects one or more streams and is configured to organize the selected streams as a pool of pending grids. The pool of pending grids may include new grids that have not yet been selected for execution and grids that have been partially executed and have been suspended.

A work distribution unit 520 that is coupled between the GMU 515 and the SMs 550 manages a pool of active grids, selecting and dispatching active grids for execution by the SMs 550. Pending grids are transferred to the active grid pool by the GMU 515 when a pending grid is eligible to execute, i.e., has no unresolved data dependencies. An active grid is transferred to the pending pool when execution of the active grid is blocked by a dependency. When execution of a grid is completed, the grid is removed from the active grid pool by the work distribution unit 520. In addition to receiving grids from the host interface unit 510 and the work distribution unit 520, the GMU 510 also receives grids that are dynamically generated by the SMs 550 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 500. An application may include instructions (i.e., API calls) that cause the driver kernel to generate one or more grids for execution. In one embodiment, the PPU 500 implements a SIMD (Single-Instruction, Multiple-Data) architecture where each thread block (i.e., warp) in a grid is concurrently executed on a different data set by different threads in the thread block. The driver kernel defines thread blocks that are comprised of k related threads, such that threads in the same thread block may exchange data through shared memory. In one embodiment, a thread block comprises 32 related threads and a grid is an array of one or more thread blocks that execute the same stream and the different thread blocks may exchange data through global memory.

In one embodiment, the PPU 500 comprises X SMs 550 (X). For example, the PPU 500 may include 15 distinct SMs 550. Each SM 550 is multi-threaded and configured to execute a plurality of threads (e.g., 32 threads) from a particular thread block concurrently. Each of the SMs 550 is connected to a level-two (L2) cache 565 via a crossbar 560 (or other type of interconnect network). A color blend unit 562 is configured to perform blend functions, such as the blend function used to accumulate the modulated sample color values and combined modulated sample values into the color buffer that may be stored in the memory 540 and cached in the L2 cache 565. In one embodiment, the color blend unit 562 may also be configured to modulate the sample color values for each pixel by setting the alpha value (srcAlpha) to the number of samples per pixel to generate a modulated sample color value or setting the alpha value to the per-pixel coverage to generate a combined modulated sample color value. For example, in terms of the OpenGL® applications programming interface the blend_func=GL_ADD, blend_src=GL_ALPHA, blend_dst=GL_ONE. The sample color value (src) is scaled by the alpha value and summed with the color value that is stored for the pixel (dst).

The L2 cache 565 is connected to one or more memory interfaces 580. Memory interfaces 580 implement 16, 32, 64, 128-bit data buses, or the like, for high-speed data transfer. In one embodiment, the PPU 500 comprises U memory interfaces 580(U), where each memory interface 580(U) is connected to a corresponding memory device 504(U). For example, PPU 500 may be connected to up to 6 memory devices 504, such as graphics double-data-rate, version 5, synchronous dynamic random access memory (GDDR5 SDRAM).

In one embodiment, the PPU 500 implements a multi-level memory hierarchy. The memory 504 is located off-chip in SDRAM coupled to the PPU 500. Data from the memory 504 may be fetched and stored in the L2 cache 565, which is located on-chip and is shared between the various SMs 550. In one embodiment, each of the SMs 550 also implements an L1 cache. The L1 cache is private memory that is dedicated to a particular SM 550. Each of the L1 caches is coupled to the shared L2 cache 565. Data from the L2 cache 565 may be fetched and stored in each of the L1 caches for processing in the functional units of the SMs 550.

In one embodiment, the PHI 500 comprises a graphics processing unit (GPU). The PPU 500 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system as well as attributes associated with each vertex of the primitive. The PPU 500 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes) to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, hull shader, geometry shader, pixel shader, etc.

For example, the GMU 515 may configure one or more SMs 550 to execute a vertex shader program that processes a number of vertices defined by the model data. In one embodiment, the GMU 515 may configure different SMs 550 to execute different shader programs concurrently. For example, a first subset of SMs 550 may be configured to execute a vertex shader program while a second subset of SMs 550 may be configured to execute a pixel shader program. The first subset of SMs 550 processes vertex data to produce processed vertex data and writes the processed vertex data to the L2 cache 565 and/or the memory 504. After the processed vertex data is rasterized (i.e., transformed from three-dimensional data into two-dimensional data in screen space) to produce fragment data, the second subset of SMs 550 executes a pixel shader to produce processed fragment data, which is then blended with other processed fragment data and written to the frame buffer in memory 504. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

A pixel shader program may be configured to generate images according to the techniques described in conjunction with FIGS. 1, 3A, 3B, 4A, and 4B when executed by one or more SMs 550. The driver kernel may be configured to insert additional instructions into a shader program, as previously described. In one embodiment, the processing cores are configured to dynamically determine a second sampling mode and corresponding shading rate based on a particular primitive fragment, power consumption mode, and/or shading performance setting. A multi-sample target buffer may be stored in the memory 504.

The PPU 500 may be included in a desktop computer a laptop computer, a tablet computer, a smart-phone (e.g., a wireless, hand-held device), personal digital assistant (PDA), a digital camera, a hand-held electronic device, and the like. In one embodiment, the PPU 500 is embodied on a single semiconductor substrate. In another embodiment, the PPU 500 is included in a system-on-a-chip (SoC) along with one or more other logic units such as a reduced instruction set computer (RISC) CPU, a memory management unit (MMU), a digital-to-analog converter (DAC), and the like.

In one embodiment, the PHI 500 may be included on a graphics card that includes one or more memory devices 504 such as GDDR5 SDRAM. The graphics card may be configured to interface with a PCIe slot on a motherboard of a desktop computer that includes, e.g., a northbridge chipset and a southbridge chipset. In yet another embodiment, the PPU 500 may be an integrated graphics processing unit (iGPU) included in the chipset (i.e., Northbridge) of the motherboard.

Figure 6:
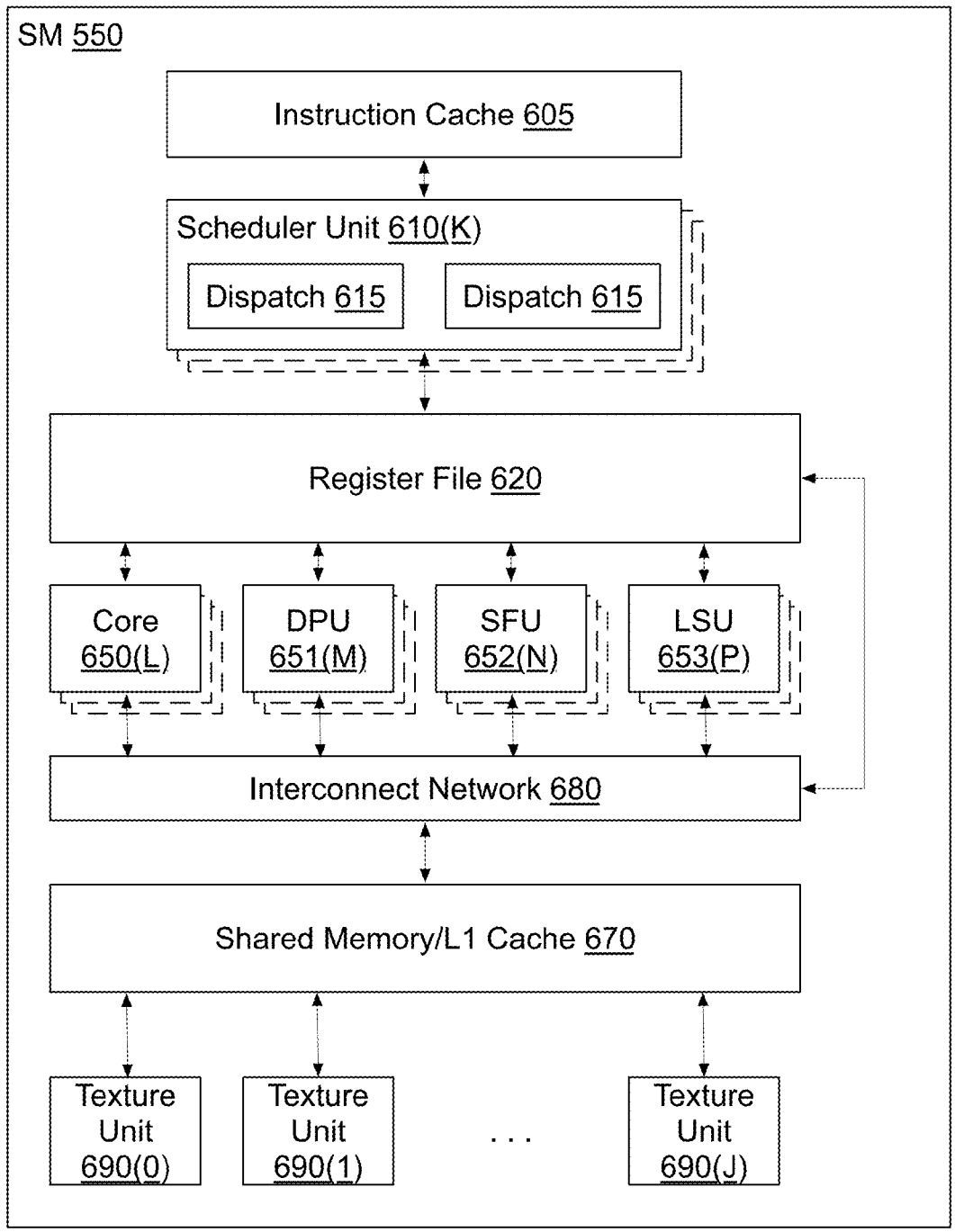
FIG. 6 illustrates the streaming multi-processor of FIG. 5, according to one embodiment.

FIG. 6 illustrates the streaming multi-processor 550 of FIG. 5, according to one embodiment. As shown in FIG. 6, the SM 550 includes an instruction cache 605, one or more scheduler units 610, a register file 620, one or more processing cores 650, one or more double precision units (DPUs) 651, one or more special function units (SFUs) 652, one or more load/store units (LSUs) 653, an interconnect network 680, a shared memory/L1 cache 670, and one or more texture units 690.

As described above, the work distribution unit 520 dispatches active grids for execution on one or more SMs 550 of the PPU 500. The scheduler unit 610 receives the grids from the work distribution unit 520 and manages instruction scheduling for one or more thread blocks of each active grid. The scheduler unit 610 schedules threads for execution in groups of parallel threads, where each group is called a warp. In one embodiment, each warp includes 32 threads. The scheduler unit 610 may manage a plurality of different thread blocks, allocating the thread blocks to warps for execution and then scheduling instructions from the plurality of different warps on the various functional units (i.e., cores 650, DPUs 651, SFUs 652, and LSUs 653) during each clock cycle.

In one embodiment, each scheduler unit 610 includes one or more instruction dispatch units 615. Each dispatch unit 615 is configured to transmit instructions to one or more of the functional units. In the embodiment shown in FIG. 6, the scheduler unit 610 includes two dispatch units 615 that enable two different instructions from the same warp to be dispatched during each clock cycle. In alternative embodiments, each scheduler unit 610 may include a single dispatch unit 615 or additional dispatch units 615.

Each SM 650 includes a register file 620 that provides a set of registers for the functional units of the SM 650. In one embodiment, the register file 620 is divided between each of the functional units such that each functional unit is allocated a dedicated portion of the register file 620. In another embodiment, the register file 620 is divided between the different warps being executed by the SM 550. The register file 620 provides temporary storage for operands connected to the data paths of the functional units.

Each SM 550 comprises L processing cores 650. In one embodiment, the SM 550 includes a large number (e.g., 192, etc.) of distinct processing cores 650. Each core 650 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 550 also comprises M DPUs 651 that implement double-precision floating point arithmetic, N SFUs 652 that perform special functions (e.g., copy rectangle, pixel blending operations, and the like), and P LSUs 653 that implement load and store operations between the shared memory/L1 cache 670 and the register file 620. In one embodiment, the SM 550 includes 64 DPUs 651, 32 SRN 652, and 32 LSUs 653.

Each SM 550 includes an interconnect network 680 that connects each of the functional units to the register file 620 and the shared memory/L1 cache 670. In one embodiment, the interconnect network 680 is a crossbar that can be configured to connect any of the functional units to any of the registers in the register file 620 or the memory locations in shared memory/L1 cache 670.

In one embodiment, the SM 550 is implemented within a GPU. In such an embodiment, the SM 550 comprises J texture units 690. The texture units 690 are configured to load texture maps (i.e., a 2D array of texels) from the memory 504 and sample the texture maps to produce sampled texture values for use in shader programs. The texture units 690 implement texture operations such as anti-aliasing operations using mipmaps (i.e., texture maps of varying levels of detail). In one embodiment, the SM 550 includes 16 texture units 690.

The PPU 500 described above may be configured to perform highly parallel computations much faster than conventional CPUs. Parallel computing has advantages in graphics processing, data compression, biometrics, stream processing algorithms, and the like.

Figure 7:
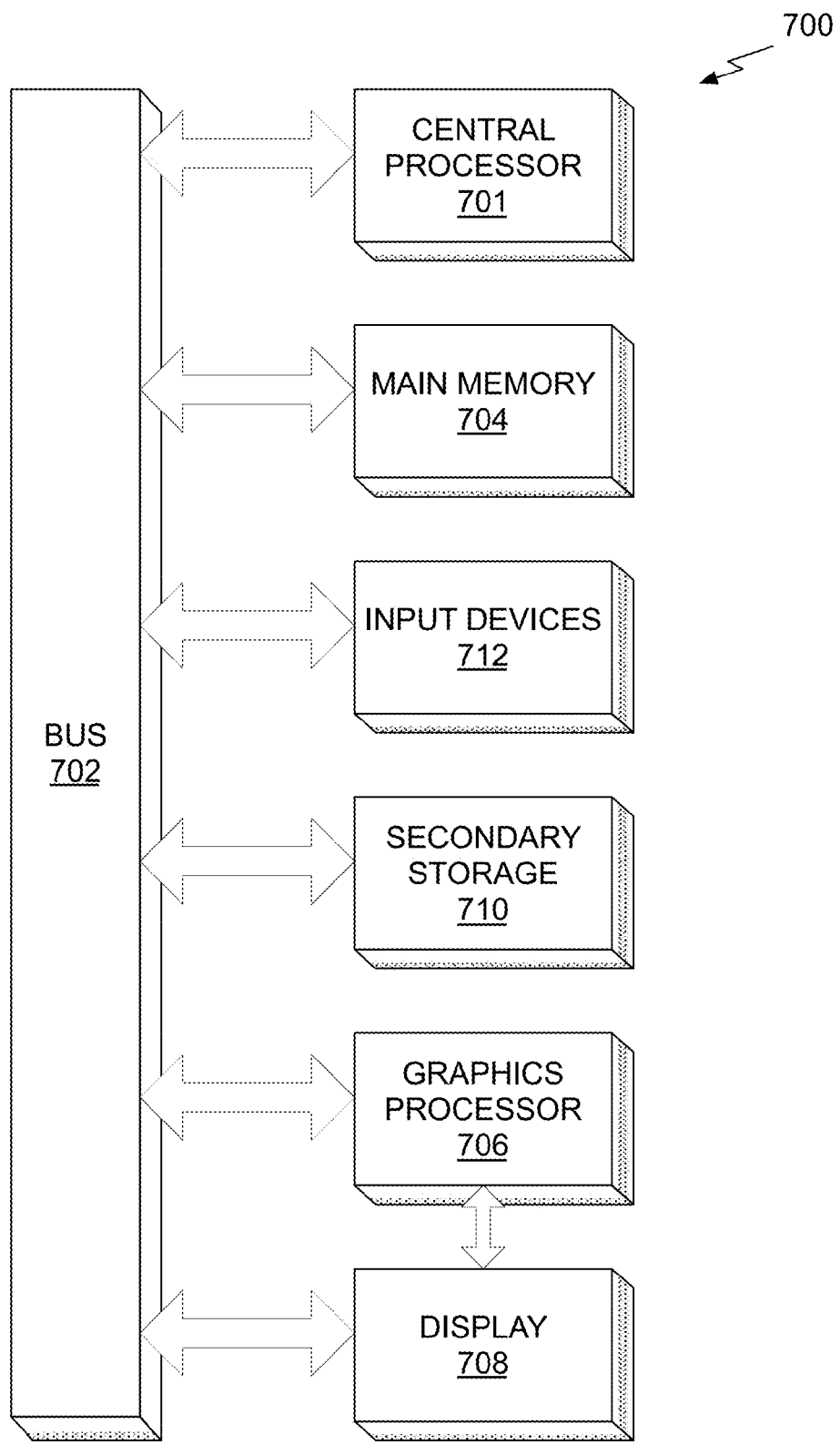
FIG. 7 illustrates an exemplary system in which the various architecture and/or functionality of the various previous embodiments may be implemented.

FIG. 7 illustrates an exemplary system 700 in which the various architecture and/or functionality of the various previous embodiments may be implemented. As shown, a system 700 is provided including at least one central processor 701 that is connected to a communication bus 702. The communication bus 702 may be implemented using any suitable protocol, such as PCI (Peripheral Component Interconnect), PCI-Express, AGP (Accelerated Graphics Port), HyperTransport, or any other bus or point-to-point communication protocol(s). The system 700 also includes a main memory 704. Control logic (software) and data are stored in the main memory 704 which may take the form of random access memory (RAM).

The system 700 also includes input devices 712, a graphics processor 706, and a display 708, i.e. a conventional CRT (cathode ray tube), LCD (liquid crystal display), LED (light emitting diode), plasma display or the like. User input may be received from the input devices 712, e.g., keyboard, mouse, touchpad, microphone, and the like. In one embodiment, the graphics processor 706 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 710 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 704 and/or the secondary storage 710. Such computer programs, when executed, enable the system 700 to perform various functions. For example, a compiler program that is configured to examiner a shader program and enable or disable attribute buffer combining may be stored in the main memory 704. The compiler program may be executed by the central processor 701 or the graphics processor 706. The main memory 704, the storage 710, and/or any other storage are possible examples of computer-readable media.

In one embodiment, the architecture and/or functionality of the various previous figures may be implemented in the context of the central processor 701, the graphics processor 706, an integrated circuit (not shown) that is capable of at least a portion of the capabilities of both the central processor 701 and the graphics processor 706, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, laptop computer, server, workstation, game consoles, embedded system, and/or any other type of logic. Still yet, the system 700 may take the form of various other devices including, but not limited to a personal digital assistant (PDA) device, a mobile phone device, a television, etc.

Further, while not shown, the system 700 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, hut should be defined only in accordance with the following claims and their equivalents.

What is claimed is:

1. A method, comprising:

generating shaded samples that are covered by a primitive fragment at a first shading rate using a first sampling mode;

storing the shaded samples in a target buffer that is associated with the first sampling mode and the first shading rate, wherein the target buffer represents a first pixel resolution;

receiving a second primitive fragment;

decreasing the first shading rate to produce a second shading rate;

determining a second sampling mode;

recasting the target buffer to represent a second pixel resolution based on the second sampling mode, wherein the second pixel resolution is lower than the first pixel resolution;

generating additional shaded samples that are covered by the second primitive fragment at the second shading using the second sampling mode; and storing the additional shaded samples in the target buffer.

2. The method of claim 1, further comprising accessing the target buffer according to the second sampling mode.

3. The method of claim 2, further comprising displaying the target buffer at a resolution corresponding to the second sampling mode.

4. The method of claim 1, wherein the first sampling mode is a multi-sample sampling mode and the second sampling mode is a single sample per pixel.

5. The method of claim 1, wherein the first sampling mode and the second sampling mode are different multi-sample sampling modes that each include multiple samples per pixel.

6. The method of claim 1, wherein either the first shading rate or the second shading rate is more than one pixel per thread shader program execution.

7. The method of claim 1, further comprising inserting additional instructions into a shader program, by a driver kernel, to offset texture coordinate derivatives computed for the additional shaded samples, wherein the texture coordinate derivatives are offset for the second sampling mode relative to the first sampling mode.

8. The method of claim 1, wherein the determining of the second sampling mode comprises estimating color variability in a group of pixels.

9. A method of shading, comprising:
receiving a primitive fragment that is associated with a first sampling mode and a first shading rate;
determining that not all pixels in a pixel group comprising at east two pixels are covered by the primitive fragment;
determining a second sampling mode for the primitive fragment;
recasting a target buffer represented in a first pixel resolution corresponding to the first sampling mode to a second pixel resolution corresponding the second sampling mode, wherein the second pixel resolution is higher than the first pixel resolution for the pixels in the pixel group;
generating, at a second shading rate, shaded samples corresponding to the primitive fragment using the second sampling mode; and
storing the shaded samples in the target buffer.

10. The method of claim 9, wherein the second shading rate is less than the first shading rate.

11. The method of claim 9, wherein the determining of the second sampling mode comprises estimating color variability in the at least two pixels.

12. The method of claim 9, wherein the first sampling mode is a super-sample sampling mode configured to compute a shaded sample for each sample location of each pixel and the second sampling mode is a multi-sample sampling mode configured to compute a single shaded sample for each pixel.

13. The method of claim 9, further comprising inserting, by a driver kernel, additional instructions into a shader program to offset texture coordinates and derivative computations when the target buffer is recast.

14. The method of claim 9, wherein the second pixel resolution is higher than the first resolution.

15. The method of claim 9, wherein either the first shading rate or the second shading rate is more than one pixel per thread shader program execution.

16. A system comprising:
a memory storing a target buffer represented in a first pixel resolution corresponding to a first sampling mode; and
one or more processing cores coupled to the memory and configured to:
receive a primitive fragment that is associated with the first sampling mode and a first shading rate;
determine that not all pixels in a pixel group comprising at least two pixels are covered by the primitive fragment;
determine a second sampling mode for the primitive fragment;
recast the target buffer represented in a first pixel resolution to a second pixel resolution corresponding to the second sampling mode, wherein the second pixel resolution is higher than the first pixel resolution for the pixels in the pixel group;
generate, at a second shading rate, shaded samples corresponding to the primitive fragment using the second sampling mode; and
store the shaded samples in the target buffer.

17. The system of claim 16, wherein the second shading rate is less than the first shading rate.

18. The system of claim 16, wherein the second sampling mode is determined by estimating color variability in a group of pixels.

19. The system of claim 16, wherein the first sampling mode is a super-sample sampling mode configured to compute a shaded sample for each sample location of each pixel and the second sampling mode is a multi-sample sampling mode configured to compute a single shaded sample for each pixel.

20. The system of claim 16, further comprising a driver kernel configured to insert additional instructions into a shades program to offset texture coordinates and derivative computations when the target buffer is recast.

* * * * *